(12) United States Patent
Hagihara et al.

(10) Patent No.: US 9,886,157 B2
(45) Date of Patent: Feb. 6, 2018

(54) TOUCH PANEL DEVICE AND METHOD OF CORRECTING COORDINATES ON TOUCH PANEL

(71) Applicant: FUJITSU COMPONENT LIMITED, Tokyo (JP)

(72) Inventors: Hideyuki Hagihara, Tokyo (JP); Yuji Makiuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 51 days.

(21) Appl. No.: 14/854,519

(22) Filed: Sep. 15, 2015

(65) Prior Publication Data

US 2016/0154506 A1  Jun. 2, 2016

(30) Foreign Application Priority Data

Dec. 2, 2014  (JP) .................................. 2014-244372

(51) Int. Cl.
*G06F 3/045* (2006.01)
*G06F 3/041* (2006.01)

(52) U.S. Cl.
CPC ............ *G06F 3/045* (2013.01); *G06F 3/0418* (2013.01)

(58) Field of Classification Search
CPC .................................. G06F 3/045; G06F 3/047
See application file for complete search history.

(56) References Cited

U.S. PATENT DOCUMENTS

| 2005/0041018 | A1 | 2/2005 | Philipp |
| 2006/0207806 | A1 | 9/2006 | Philipp |
| 2009/0046079 | A1 | 2/2009 | Inoue et al. |
| 2009/0109195 | A1* | 4/2009 | Kent ........................ G06F 3/045 345/178 |
| 2011/0043482 | A1 | 2/2011 | Philipp |
| 2012/0044206 | A1 | 2/2012 | Philipp |

FOREIGN PATENT DOCUMENTS

| JP | 2005-134992 | 5/2005 |
| JP | 2007-503037 | 2/2007 |
| JP | 2009-48277 | 3/2009 |

OTHER PUBLICATIONS

Patent Abstracts of Japan, Publication No. 2009-48277, published Mar. 5, 2009.
Patent Abstracts of Japan, Publication No. 2005-134992, published May 26, 2005.

* cited by examiner

*Primary Examiner* — Kevin M Nguyen
(74) *Attorney, Agent, or Firm* — Staas & Halsey LLP

(57) ABSTRACT

A touch panel device includes: a detection unit that detects coordinates of a pressed point on an input surface of a touch panel; and a correction unit that corrects the coordinates detected by the detection unit to obtain corrected coordinates, wherein the correction unit approximates, when a predetermined number of reference points arranged on the input surface are pressed, curves passing through coordinates of the reference points by second order or higher order polynomial equations, specifies, when an arbitrary point on the input surface is pressed, a region including coordinates of the arbitrary point from regions obtained by dividing the input surface by the curves, calculates distances from the coordinates of the arbitrary point to curves that define the specified region among the curves with the second order or higher order polynomial equations, and calculates the corrected coordinates based on a location of the specified region and the distances.

3 Claims, 13 Drawing Sheets

WHEN WIRING RESISTANCE IS LOW

WHEN WIRING RESISTANCE IS HIGH

TOUCH PANEL DEVICE AND METHOD OF CORRECTING COORDINATES ON TOUCH PANEL

CROSS-REFERENCE TO RELATED APPLICATION

This application is based upon and claims the benefit of priority of the prior Japanese Patent Application No. 2014-244372 filed on Dec. 2, 2014, the entire contents of which are incorporated herein by reference.

FIELD

A certain aspect of the embodiments is related to a touch panel device and a method of correcting coordinates on a touch panel.

BACKGROUND

The diffusion of mobile electronic devices such as tablet terminal devices and portable game devices leads to wide use of touch panels that detect input coordinates in the display screen. A four-wire or five-wire resistive touch panel detects input coordinates based on the electric potential of the resistance film corresponding to a pressed point on the input surface of the touch panel.

The detected input coordinates, however, have deviations from the actual coordinates of the pressed point because the equipotential lines in the resistance film are curvilinearly distorted due to the effect of the resistance values of the electrodes located in the edges of the resistance film. The deviation of the detected input coordinates can be reduced by using electrodes having a low resistance value, but an overcurrent flows through an electronic component, such as a transistor coupled to the electrode, and thus may break it. Furthermore, the use of an electronic component having a high pressure resistance is possible, but increases the cost of the touch panel device.

To address the above described problem, Japanese Patent Application Publication Nos. 2009-48277, 2005-134992, and 2007-503037 (Patent Documents 1, 2, and 3) disclose methods of correcting input coordinates on a touch panel.

SUMMARY

According to an aspect of the present invention, there is provided a touch panel device including: a detection unit that detects coordinates of a pressed point on an input surface of a touch panel; and a correction unit that corrects the coordinates detected by the detection unit to obtain corrected coordinates, wherein the correction unit approximates, when a predetermined number of reference points arranged on the input surface are pressed, curves passing through coordinates of the reference points detected by the detection unit by second order or higher order polynomial equations, the correction unit specifies, when an arbitrary point on the input surface is pressed, a region including coordinates of the arbitrary point detected by the detection unit from regions obtained by dividing the input surface by the curves, the correction unit calculates distances from the coordinates of the arbitrary point detected by the detection unit to curves that define the specified region among the curves with the second order or higher order polynomial equations, and the correction unit calculates the corrected coordinates based on a location of the specified region on the input surface and the distances to the curves.

According to another aspect of the present invention, there is provided a method of correcting coordinates on a touch panel, the method detecting coordinates of a pressed point on an input surface of the touch panel and correcting the detected coordinates to obtain corrected coordinates, the method comprising: approximating, when a predetermined number of reference points arranged on the input surface are pressed, curves passing through the detected coordinates of the reference points by second order or higher order polynomial equations; specifying, when an arbitrary point on the input surface is pressed, a region including the detected coordinates of the arbitrary point from regions obtained by dividing the input surface by the curves; calculating distances from the detected coordinates of the arbitrary point to curves that define the specified region among the curves with the second order or higher order polynomial equations; and calculating the corrected coordinates based on a location of the specified region on the input surface and the distances to the curves.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The method disclosed in Patent Document 1 corrects input coordinates on a touch panel with first-order polynomial equations. Thus, when equipotential lines get curvilinearly distorted as with in a four-wire or five-wire touch panel having an anomalous external shape (e.g., a circular shape), the input coordinates cannot be corrected with high accuracy. Patent Document 2 discloses a method of correcting input coordinates on a touch panel with first order and second order polynomial equations, but performs a complicated multiple-stage approximation process. Thus it needs not only a great deal of processing time but also massive hardware including a high-capacity memory.

Figure 1:
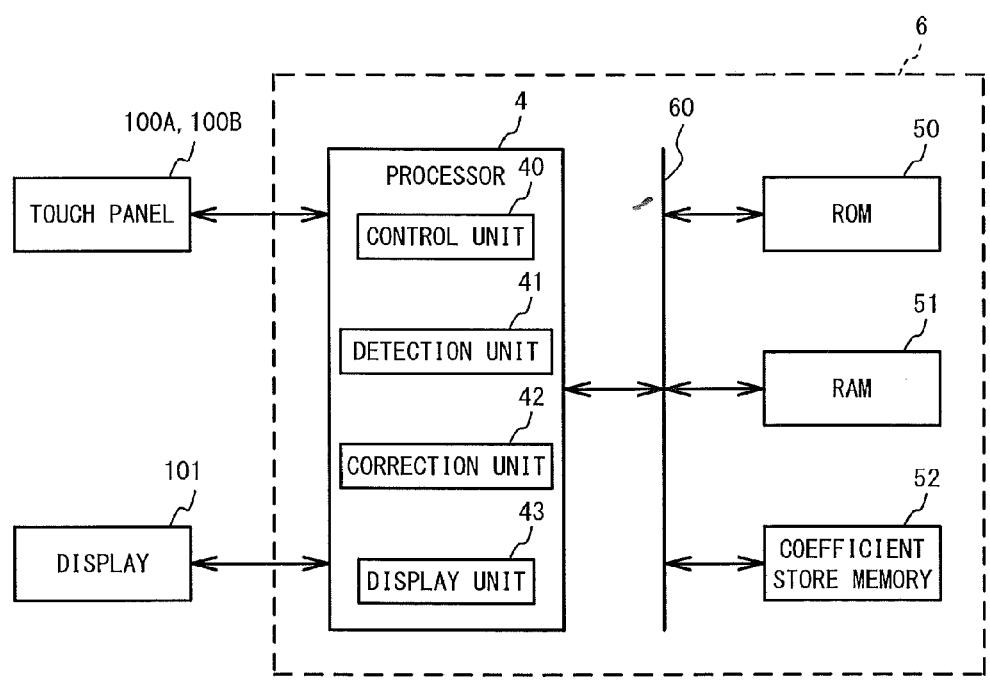
FIG. 1 is a configuration diagram of an exemplary touch panel device.

FIG. 1 is a configuration diagram of an exemplary touch panel device. The touch panel device includes a touch panel 100A, 100B, a display 101, and a control device 6. The touch panel 100A, 100B is, for example, a four-wire or five-wire touch panel.

The display 101 is, for example, a liquid-crystal display, and has a display surface located so as to overlap with the input surface of the touch panel 100A, 100B when viewed from the front.

The control device 6 includes a processor 4 such as a Digital Signal Processor (DSP), a Read Only Memory (ROM) 50 storing a program to operate the processor 4, a Random Access Memory (RAM) 51 functioning as a work memory, and a coefficient store memory 52. The processor 4 is coupled to the touch panel 100A, 100B and the display 101, and also coupled to the ROM 50, the RAM 51, and the coefficient store memory 52 through a bus 60.

The processor 4 reads the program from the ROM 50 when the power is turned on, and implements a control unit 40, a detection unit 41, a correction unit 42, and a display unit 43 as its function. The control unit 40 controls, for example, switches driving the touch panel 100A, 100B. The detection unit 41 detects the coordinates of a point pressed on the input surface of the touch panel 100A, 100B. The detection unit 41 calculates the coordinates based on the electric potential of the pressed point as described later.

The correction unit 42 corrects the coordinates detected by the detection unit 41 to obtain corrected coordinates. The equipotential lines of the resistance film of the touch panel 100A, 100B get curvilinearly distorted due to, for example, the effect of the resistance values of the electrodes located in the edges of the conductive film, and thus the coordinates detected by the detection unit 41 deviates from the actual coordinates of the pressed point. The correction unit 42 writes the coefficients of the approximate expression calculated in the correction process described later in the coefficient store memory 52. The coefficient store memory 52 is, for example, a flash memory.

The display unit 43 performs the display processing of the display 101. The display unit 43 displays the positions of calibration points, which are reference points arranged on the input surface of the touch panel 100A, 100B, on the display 101 in the calculation process of the coefficients of approximate expressions.

A description will next be given of the structure of the touch panel 100A, 100B. The structure of the four-wire touch panel 100A will be described first, and then the structure of the five-wire touch panel 100B will be described.

Figure 2:
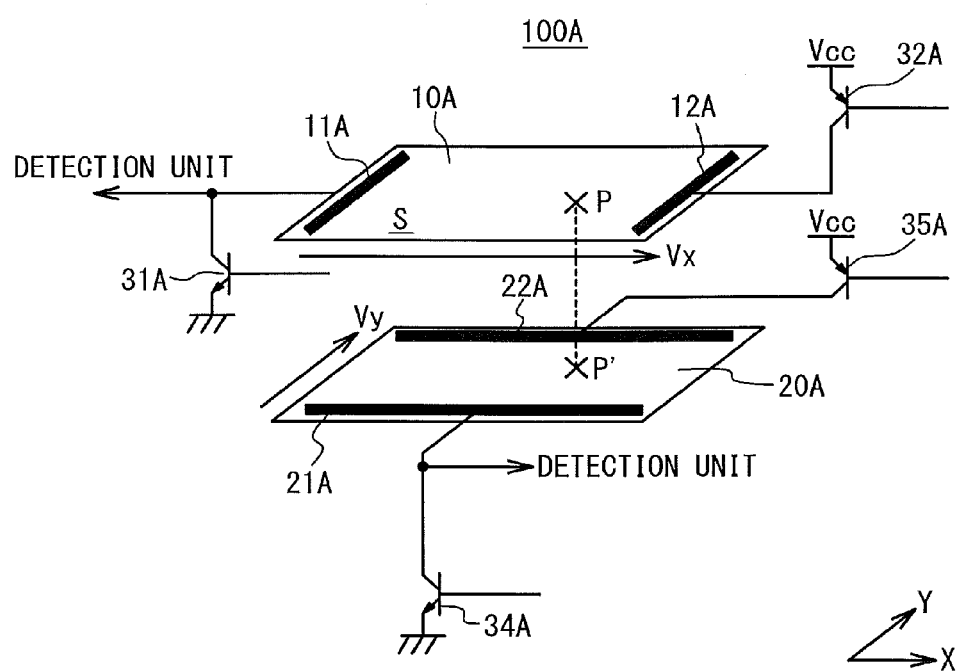
FIG. 2 is a diagram illustrating an exemplary structure of a four-wire touch panel.

FIG. 2 illustrates an exemplary structure of the four-wire touch panel 100A. The four-wire touch panel 100A includes resistance films 10A, 20A facing each other, electrodes 11A, 12A, 21A, 22A, and switches 31A, 32A, 34A, 35A. In FIG. 2, the X direction is a direction parallel to the electrode 21A, and the Y direction is a direction parallel to the electrode 11A.

The resistance films 10A, 20A have, for example a rectangular shape, but may have other shapes. The switches 31A, 32A, 34A, 35A are, for example, transistors, but are not limited to transistors. The base of each of the switches 31A, 32A, 34A, 35A is connected to the control unit 40, and the control unit 40 controls turn on/off of the switches 31A, 32A, 34A, 35A.

The electrode 11A is located in a first edge of the resistance film 10A in the X direction, and the electrode 12A is located in a second edge of the resistance film 10A in the X direction. The electrodes 11A and 12A are formed of, for example, a indium tin oxide (ITO) thin film.

The electrode 11A connects to the collector of the switch 31A and the detection unit 41. The emitter of the switch 31A is grounded. The electrode 12A connects to the switch 32A, and power source voltage Vcc is applied to the emitter of the switch 32A.

The electrode 21A is located in a first edge of the resistance film 20A in the Y direction, and the electrode 22A is located in a second edge of the resistance film 20A in the Y direction. The electrode 22A connects to the collector of the switch 35A, and power source voltage Vcc is applied to the emitter of the switch 35A. The electrode 21A connects to the detection unit 41 and the collector of the switch 34A. The emitter of the switch 34A is grounded.

The resistance films 10A, 20A are stacked to face each other across dot spacers not illustrated. The resistance films 10A, 20A are separated from each other by a distance defined by the thickness of the dot spacer, and come in contact with each other by press with a stylus or the like. The detection unit 41 detects the X coordinate and the Y coordinate of a pressed point P on the input surface S from the voltage of the pressed point P and the voltage of a contact point P' that makes contact with the pressed point P in the resistance film 20A.

To detect the X coordinate of the pressed point P, the control unit 40 turns on the switches 31A, 32 and turns off the switches 34A, 35A. This control allows power source voltage Vcc to be applied between the electrodes 11A and 12A of the resistance film 10A, generating potential gradient Vx in the X direction. At this time, the voltage of the pressed point P is input to the detection unit 41 through the resistance film 20A.

To detect the Y coordinate of the pressed point P, the control unit 40 turns on the switches 34A, 35A and turns off the switches 31A, 32A. This control allows power source voltage Vcc to be applied between the electrodes 21A and 22A of the resistance film 20A, generating potential gradient Vy in the Y direction. At this time, the voltage of the contact point P' is input to the detection unit 41 through the resistance film 10A.

The detection unit 41 converts the voltage of the pressed point P and the voltage of the contact point P' to digital values, and detects the coordinates of the pressed point P based on the converted digital values. The control unit 40 alternately repeats the process for detecting the X coordinate of the pressed point P and the process for detecting the Y coordinate of the pressed point P.

Figure 3:
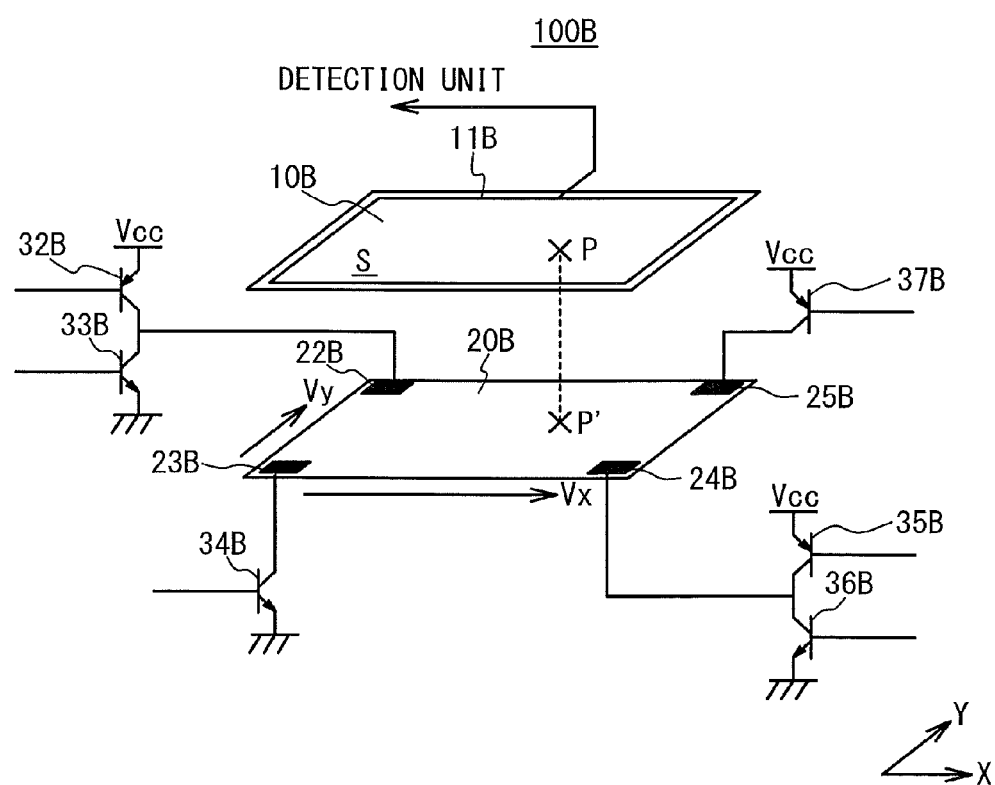
FIG. 3 is a diagram illustrating an exemplary structure of a five-wire touch panel.

FIG. 3 illustrates an exemplary structure of the five-wire touch panel 100B. The five-wire touch panel 100B includes resistance films 10B, 20B facing each other, electrodes 11B, 22B~25B, and switches 32B~37B. In FIG. 3, the X direction is a direction extending from the electrode 23B to the electrode 24B, and the Y direction is a direction extending from the electrode 23B to the electrode 22B.

The resistance films 10B, 20B have, for example, a rectangular shape, but may have other shapes. The switches 32B~37B are, for example, transistors, but are not limited to transistors. The electrode 11B is located in the outer periphery of the resistance film 10B. The electrode 11B is coupled to the detection unit 41. The base of each of the switches 32B~37B is coupled to the control unit 40, and the control unit 40 controls turn on/off of the switches 32B~37B.

The electrodes 22B~25B are located in four corners of the resistance film 20B. The electrode 22B is coupled to the collectors of the switches 32B and 33B. Power source voltage Vcc is applied to the emitter of the switch 32B. The emitter of the switch 33B is grounded. The electrode 23B is coupled to the collector of the switch 34B. The emitter of the switch 34B is grounded.

The electrode 24B is coupled to the collectors of the switches 35B and 36B. Power source voltage Vcc is applied to the emitter of the switch 35B. The emitter of the switch 36B is grounded. The electrode 25B is coupled to the collector of the switch 37B. Power source voltage Vcc is applied to the emitter of the switch 37B.

The resistance films 10B, 20B are stacked to face each other across dot spacers not illustrated. The resistance films 10B, 20B are separated from each other by a distance defined by the thickness of the dot spacer, and come in contact with each other by press with a stylus or the like. The detection unit 41 detects the X coordinate and the Y coordinate of the pressed point P on the input surface S from the voltage of the contact point P' that makes contact with the pressed point P in the resistance film 20B.

To detect the X coordinate of the pressed point P, the control unit 40 turns on the switches 34B, 35B, 33B, 37B, and turns off the switches 36B, 32B. This control allows power source voltage Vcc to be applied between the electrodes 24B and 25B and between the electrodes 22B and 23B of the resistance film 20B, generating potential gradient Vx in the X direction. At this time, the voltage of the pressed point P is input to the detection unit 41 through the electrode 11B of the resistance film 10B.

To detect the Y coordinate of the pressed point P, the control unit 40 turns on the switches 32B, 34B, 36B, 37B, and turns off the switches 33B, 35B. This control allows power source voltage Vcc to be applied between the electrodes 22B and 25B and between the electrodes 23B and 24B in the resistance film 20B, generating potential gradient Vy in the Y direction. At this time, the voltage of the pressed point P is input to the detection unit 41 through the electrode 11B of the resistance film 10B.

The detection unit 41 converts the voltages of the pressed point P into digital values, and detects the coordinates of the pressed point P based on the converted digital values. The control unit 40 alternately repeats the process for detecting the X coordinate of the pressed point P and the process for detecting the Y coordinate of the pressed point P.

The coordinates of the pressed point detected in the above described manner includes a deviation as described above. The deviation of the coordinates increases as the wiring resistances of the electrodes 11A, 12A, 21A, 22A, 22B~25B (i.e., the wiring resistances of two sides in the X direction and two sides in the Y direction) increase.

Figure 4A:
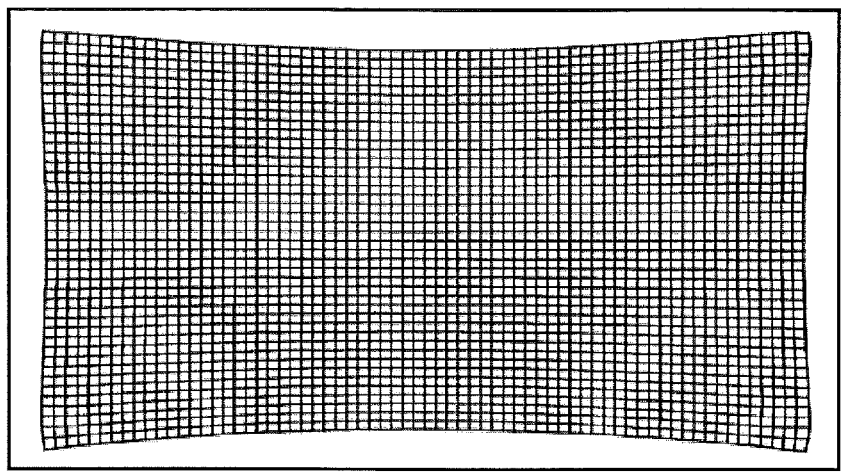
FIG. 4A is a diagram illustrating distortion characteristics of the grid coordinate pattern of the five-wire touch panel when a resistance is low.
Figure 4B:
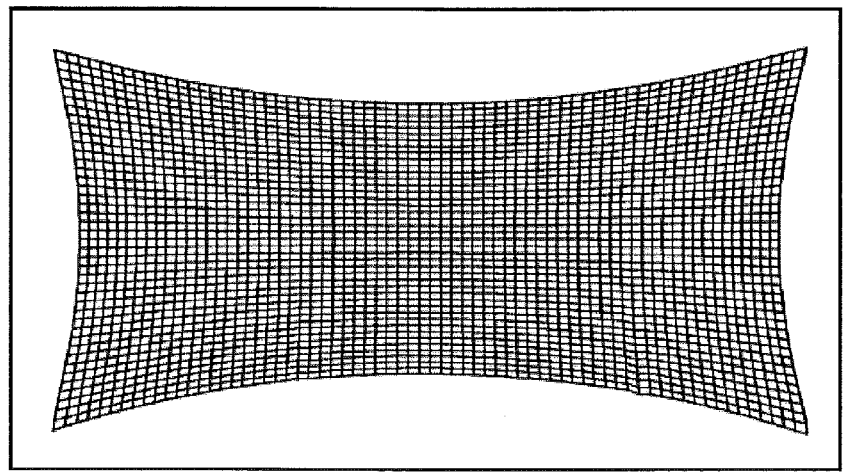
FIG. 4B is a diagram illustrating distortion characteristics of the grid coordinate pattern of the five-wire touch panel when a resistance is high.

FIG. 4A illustrates distortion characteristics of the grid coordinate pattern of the five-wire touch panel 100B when the wiring resistance is low, and FIG. 4B illustrate distortion characteristics of the grid coordinate pattern of the five-wire touch panel 100B when the wire resistance is high. That is to say, FIG. 4A and FIG. 4B illustrate results (simulation results) of a grid pattern of detected coordinates corresponding to the grid pattern of the actual coordinates of pressed points on the input surface S. Thus, as the degree of distortion of grids increases, the deviation of the detected coordinates increases.

As illustrated in FIG. 4A, when the electrodes 22B~25B have a low resistance value, the deviation of the coordinates is small. However, in this case, an overcurrent flows through the electronic components such as the switches 32B~37B coupled to the electrodes 22B~25B, and thus may break them. Furthermore, the use of electronic components having a high pressure resistance is possible, but increases the cost of the touch panel device.

Thus, the correction unit 42 corrects the coordinates detected by the detection unit 41 to obtain corrected coordinates. The wiring resistance varies depending on the volume resistance value of ink and a variation in production conditions (especially, printing conditions), and thus a correction method insulated from the influence of the variation is preferable.

Figure 5:
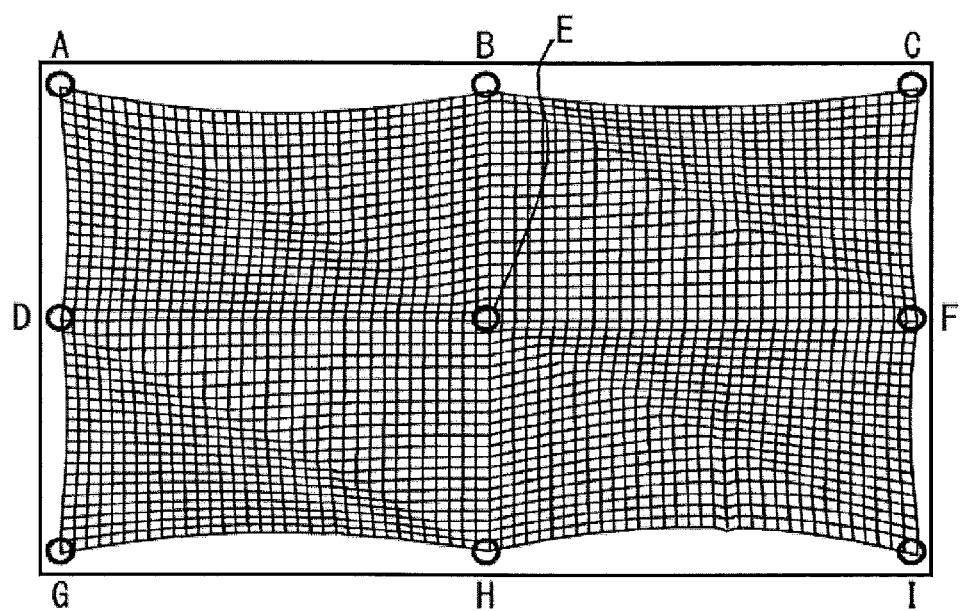
FIG. 5 is a diagram illustrating a grid coordinate pattern after the correction by a comparative example.

FIG. 5 illustrates a grid coordinate pattern after the correction by a comparative example. The comparative example performs a correction process with a method similar to the method disclosed in Patent Document 1. The comparative example presents simulation results of the coordinate pattern when a correction process using predetermined nine calibration points A~I (arranged in 3×3 array) on the input surface S, i.e. nine-point calibration, is performed in the five-wire touch panel 100B.

The method disclosed in Patent Document 1 corrects the coordinates of the pressed point with first order polynomial equations, and thus cannot correct the coordinates with high accuracy when the equipotential lines are curvilinearly distorted as with in the five-wire touch panel 100B. Thus, the coordinates located in the periphery are not sufficiently corrected, and curved parts exist as observed, for example, between the calibration points A and B or between B and.

If the number of calibration points is increased, the degree of curvature can be reduced depending on the size of the input surface S, but the time of adjustment work pressing the calibration points in the manufacturing process of the touch panel device increases. Thus, a method that enables to correct the coordinates with high accuracy by using a small number of calibration points is preferable.

The touch panel device of the embodiment performs a correction process with high accuracy by approximating the curving characteristics of the coordinates by second order or higher order polynomial equations, as described later. Furthermore, the touch panel device of the embodiment does not need massive hardware and perform the correction process in a short time because it does not perform a complicated multiple-stage approximation process unlike the method disclosed in Patent Document 2.

Figure 6:
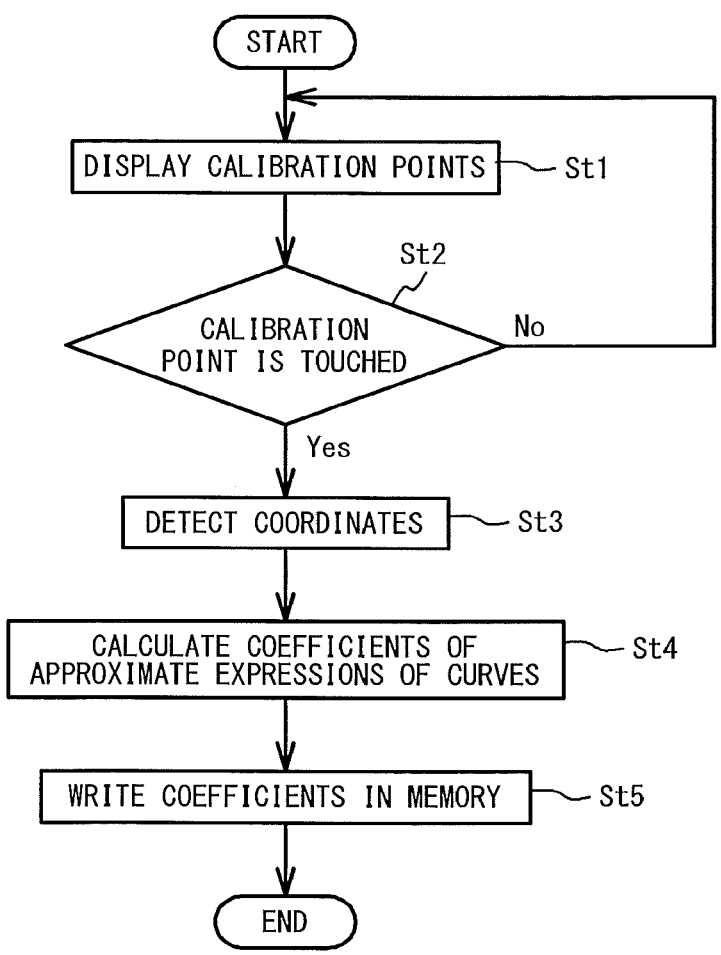
FIG. 6 is a flowchart of an approximation process of curves.

FIG. 6 is a flowchart of an approximation process of curves. The present embodiment describes 20 (5×4)-point calibration for convenience sake, but the process described hereinafter is performed in the same manner in nine-point calibration, and twenty or more point calibration.

Figure 7:
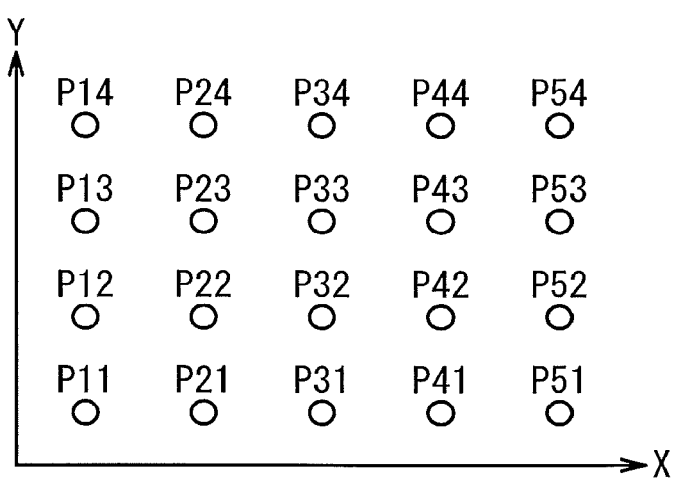
FIG. 7 is a diagram illustrating calibration points.

The display unit 43 displays calibration points on the display 101 (step SM. FIG. 7 illustrates the calibration points. Twenty calibration points P11~P54 located at equal intervals vertically as well as horizontally are displayed on the display screen (X-Y plane) of the display 101. The calibration points P11~P54 correspond to a predetermined number of reference points arranged on the input surface S. The calibration points P11, P14, P51, P54 are located at corners of the rectangular display surface. The correction unit 42 stores the actual coordinates of the calibration points P11~P54 in advance.

When each of the calibration points P11~P54 is touched (step St2/Yes), the detection unit 41 detects the coordinates with the method described with reference to FIG. 2 and FIG. 3 On the other hand, when no point is touched (step St2/No), the process of the step St1 is repeated.

Figure 8:
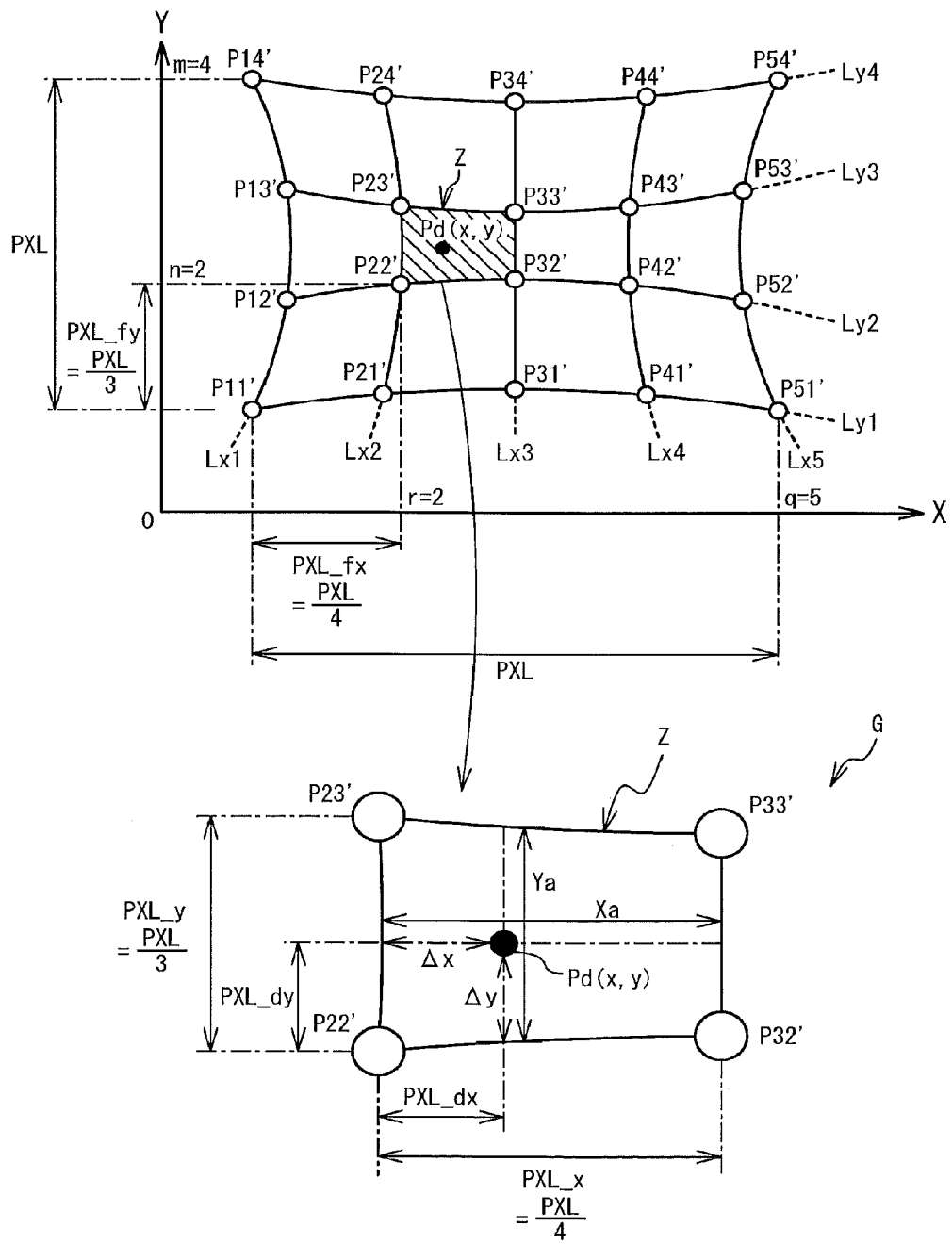
FIG. 8 is a diagram illustrating curves passing through the coordinates of the calibration points.

The correction unit 42 then calculates the coefficients of the approximate expressions of the curves that pass through the coordinates of the calibration points P11~P54 detected by the detection unit 41 (step St4). FIG. 8 illustrates curves Lx1~Lx5, Ly1~Ly4 that pass through the coordinates of the calibration points P11~P54. FIG. 8 illustrates the curves Lx1~Lx5, Ly1~Ly4 in the five-wire touch panel 100B.

References P11'~P54' indicate the coordinates in the X-Y plane of the calibration points P11~P54 detected by the detection unit 41. The coordinates of the calibration points P11~P54 exhibit a distorted grid pattern as with in FIG. 4A and FIG. 4B.

The correction unit 42 approximates the curves passing through the coordinates P11'~P54' by second order polynomial equations with respect to each of rows and columns of the arranged calibration points P11~P54. For example, the curve Lx1 passes through the coordinates P11'~P14' of the calibration points P11~P14 in the first column, and the curve Lx2 passes through the coordinates P21'~P24' of the calibration points P21~P24 in the second column. The curve Ly1 passes through the coordinates P11'~P51' of the calibration point P11~P51 in the first row, and the curve Ly2 passes through the coordinates P12'~P52' of the calibration points P12~P52 in the second row.

$$x_r = a_r y^2 + b_r y + c_r (r=1,2,\ldots,q) \quad (1)$$

$$y_n = a_n x^2 + b_n x + c_n (n=1,2,\ldots,m) \quad (2)$$

More specifically, when the coordinates detected by the detection unit 41 is (x, y), the correction unit 42 approximates the curves Lx1~Lx5 extending in the Y direction by the above expression 1, and the curves Ly1~Ly4 extending in the X direction by the above expression 2. The variable $x_r$ represents the X coordinate of the curve Lx1~Lx5, and the variable $y_n$ represents the Y coordinate of the curve Ly1~Ly4.

The value q is the number of calibration points arranged in the X direction, i.e., the number of columns of the calibration points P11~P54, and is five (q=5) in this example. On the other hand, the value m is the number of calibration points arranged in the Y direction, i.e., the number of rows of the calibration points P11~P54, and is four (m=4) in this example. Thus, the integer r is an identification number of the curve Lx1~Lx5, and the integer n is an identification number of the curve Ly1~Ly4.

The correction unit 42 calculates the coefficients $a_r$, $b_r$, $c_r$ of the expression 1 and the coefficients $a_n$, $b_n$, $c_n$ of the expression 2 from the coordinates P11'~P54' detected by the detection unit 41. That is to say, the correction unit 42 approximates the curves Lx1~Lx5, Ly1~Ly4 passing through the coordinates P11'P54' detected by the detection unit 41 by second order polynomial equations when the predetermined number of the calibration points P11~P54 arranged on the input surface S are pressed. The approximate expression is not limited to a second order polynomial equation, and a second order or higher order (for example, third order or fourth order) polynomial equation may be used.

The correction unit 42 then writes the calculated coefficients $a_r$, $b_r$, $c_r$, $a_n$, $b_n$, $c_n$ in the coefficient store memory 52 (step St5). The calibration points P11~P54 of the present embodiment have 5 rows and 4 columns, and thus 27 (3×(5+4)) coefficients are stored in the coefficient store memory 52. The approximation process of the curves Lx1~Lx5, Ly1~Ly4 are performed as described above. The approximation process is performed in, for example, the adjustment process in the manufacturing of the touch panel device.

The correction unit 42 corrects the coordinates by using the coefficients $a_r$, $b_r$, $c_r$, $a_n$, $b_n$, $c_n$ calculated through the approximation process. The following describes a correction process of the coordinates.

Figure 9:
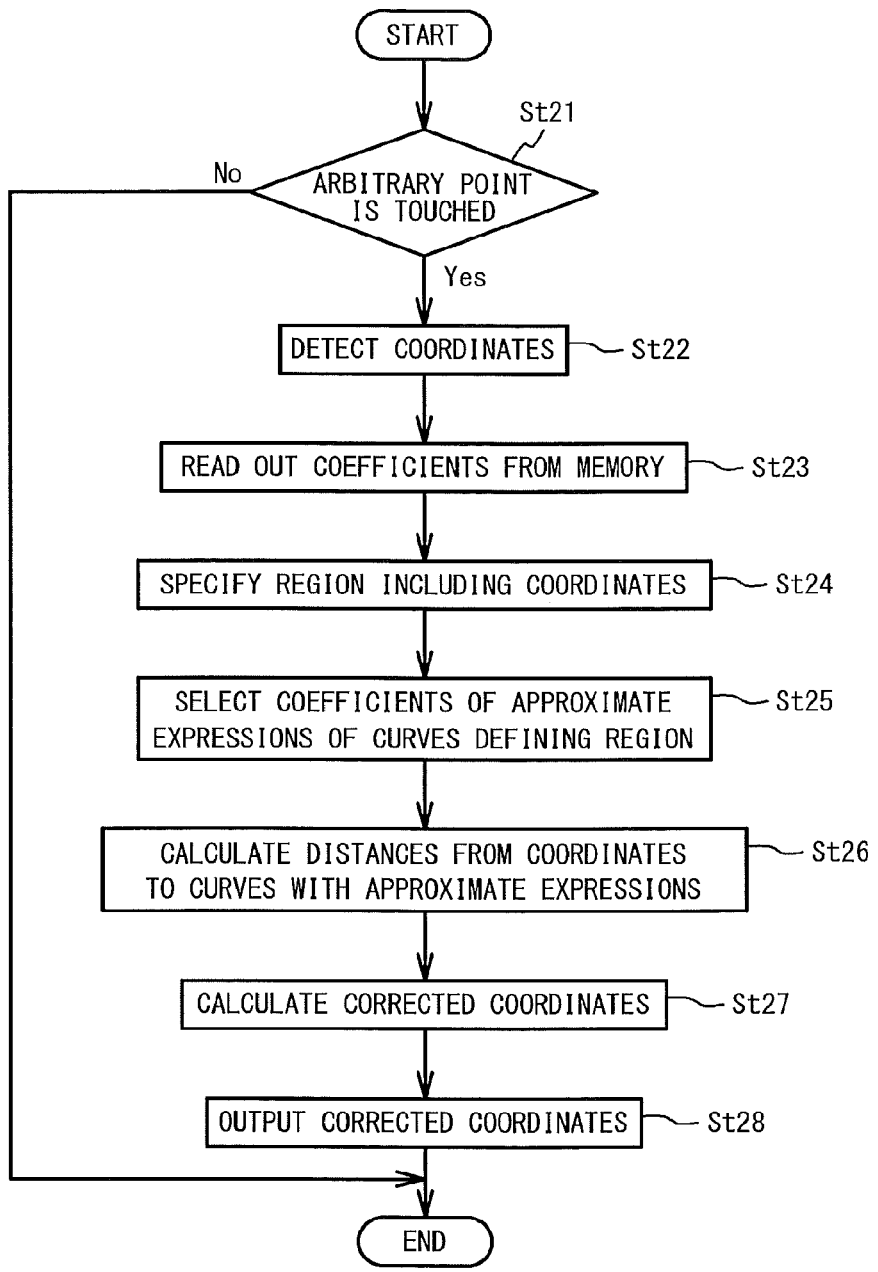
FIG. 9 is a flowchart of a coordinates correction process.

FIG. 9 is a flowchart of a coordinates correction process. When an arbitrary point on the input surface S is touched (step St21/Yes), the detection unit 41 detects the coordinates of the pressed point (step St22). On the other hand, when no point is touched (step St21/No), the process is ended.

The correction unit 42 then reads out the coefficients $a_r$, $b_r$, $c_r$, $a_n$, $b_n$, $c_n$ from the coefficient store memory 52 (step St23). The correction unit 42 then specifies a region Z including the coordinates Pd(x, y) detected by the detection unit 41 from regions obtained by dividing the input surface S by the curves Lx1~Lx5, Ly1~Ly4 as illustrated in FIG. 8 (step St24). That is to say, the correction unit 42 specifies the region Z including the coordinates detected by the detection unit 41 when an arbitrary point on the input surface S is pressed.

In the present example, the coordinates Pd(x, y) of the pressed point is included in the region Z defined by the coordinates P22', P23', P32', P33' of the calibration points P22, P23, P32, P33. The method of specifying the region Z is not limited to the above method. For example, the region Z can be specified by assigning the coordinates Pd(x, y) of the pressed point to the above described approximate expressions 1 and 2.

More specifically, the correction unit 42 specifies two curves, which are closest to the coordinates Pd in the X direction, from the curves Lx1~Lx5 based on the X coordinate $x_r$ obtained by assigning the Y coordinate of the pressed point to the approximate expression 1. The correction unit 42 specifies two curves, which are closest to the coordinates Pd in the Y direction, from the curves Ly1~Ly4 based on the Y coordinate $y_n$ obtained by assigning the X coordinate of the pressed point to the approximate expression 2. In this example, the correction unit 42 specifies the curves Lx2, Lx3, Ly2, Ly3 closest to the coordinates Pd. In other words, the correction unit 42 specifies the values of the integers r, n in the approximate expressions 1 and 2.

As described above, the correction unit 42 specifies the region Z including the coordinates Pd detected by the detection unit 41 based on the coordinates $x_r$, $y_n$ calculated from the coordinates Pd detected by the detection unit 41 by using the approximate expressions 1 and 2 when an arbitrary point on the input surface S is pressed.

The correction unit 42 then selects the coefficients $a_r$, $b_r$, $c_r$, $a_n$, $b_n$, $c_n$ of the approximate expressions of the curves Lx2, Lx3, Ly2, Ly3 that define the specified region Z (step St25). Through this step, the correction unit 42 determines the approximate expressions used to calculate corrected coordinates.

The correction unit 42 then calculates distances Δx, Δy from the coordinates Pd of the arbitrary point detected by the detection unit 41 to the curves Lx2, Ly2 that define the specified region Z among the curves Lx1~Lx5, Ly1~Ly4 with approximate expressions (step St26). Reference G in FIG. 8 exhibits an enlarged view of the specified region Z. In this example, the correction unit 42 calculates the distance Δx to the curve Lx2 and the distance Δy to the curve Ly2, where the curves Lx2, Ly2 of the curves Lx2, Lx3, Ly2, Ly3, which define the region Z, are closer to the original point. The correction unit 42, however, may calculate the distances to all the curves Lx2, Lx3, Ly2, Ly3.

$$\Delta x = x - x_r \quad (3)$$

$$\Delta y = y - y_n \quad (4)$$

More specifically, the correction unit 42 calculates the distance $\Delta x$ with the above expression 3, and the distance $\Delta y$ with the above expression (4). Here, the X coordinate $x_r$ and the Y coordinate $y_n$ are calculated from the approximate expressions 1 and 2 of the curves Ly2, Lx2 to which the coefficients selected at the step St25 are applied.

The correction unit 42 then calculates corrected coordinates (Xc, Yc) based on the location of the specified region Z on the input surface S and the distances $\Delta x$, $\Delta y$ to the curves (step St27). The correction unit 42 calculates the corrected coordinates (Xc, Yc) by using the number of vertical pixels PXL and the number of horizontal pixels PXL of the input surface S. The number of pixels PXL is an indicator of resolutions of the input surface S in detecting the coordinates.

$$PXL\_x = PXL/(q-1) \quad (5)$$

$$PXL\_y = PXL/(m-1) \quad (6)$$

The number of pixels in the X direction PXL_x in a single region is calculated with the above expression 5, and the number of pixels in the Y direction PXL_y in a single region is calculated with the above expression 6. In the example of FIG. 8, the number of columns of the calibration points P11~P54 is five (q=5), and thus the number of pixels in the X direction PXL_x in a single region is PXL/4. On the other hand, the number of rows of the calibration points P11~P54 is four (m=4), and thus the number of pixels in the Y direction PXL_y in a single region is PXL/3.

The correction unit 42 calculates the numbers of pixels PXL_dx, PXL_dy respectively corresponding to the distances $\Delta x$, $\Delta y$ calculated at the step St25 from the above described numbers of pixels PXL_x, PXL_y. As understood with reference to the reference G in FIG. 8, the number of pixels PXL_dx in the X direction corresponding to the distance $\Delta x$ is calculated from the ratio of the distance $\Delta x$ to the width Xa in the X direction of the region Z, which passes through the coordinates Pd of the pressed point. On the other hand, the number of pixels PXL_dy in the Y direction corresponding to the distance $\Delta y$ is calculated from the ratio of the distance $\Delta y$ to the height Ya in the Y direction of the region Z, which passes through the coordinates Pd of the pressed point.

$$PXL\_dx = PXL\_x \cdot (\Delta x / Xa) \quad (7)$$

$$PXL\_dy = PXL\_y \cdot (\Delta y / Ya) \quad (8)$$

Thus, the correction unit 42 calculates the numbers of pixels PXL_dx with the above expression 7, and the number of pixels PXL_dy with the above expression 8.

Here, the width Xa and the height Ya are calculated from the integers r, n determined in accordance with the specified region Z by using the approximate expressions 1, 2, respectively. In the present example, the width Xa is a distance between the curves Lx2 and Lx3 located across the coordinates Pd of the pressed point, and the height Ya is a distance between the curves Ly2 and Ly3 located across the coordinates Pd of the pressed point.

$$Xa = x_{r+1} - x_r \quad (9)$$

$$Ya = Y_{n+1} - y_n \quad (10)$$

Thus, the width Xa and the height Ya are calculated from the above expressions 9 and 10, respectively.

$$PXL\_dx = \{PXL/(q-1)\} \cdot \{(x-x_r)/(x_{r+1}-x_r)\} \quad (11)$$

$$PXL\_dy = \{PXL/(m-1)\} \cdot \{(y-y_n)/(y_{n+1}-y_n)\} \quad (12)$$

Thus, the number of pixels PXL_dx is represented by the above expression 11 obtained by substituting the expressions 5, 9 to the expression 7, and the number of pixels PXL_dy is represented by the above expression 12 obtained by substituting the expressions 6, 10 to the expression 8. The method of calculating the numbers of pixels PXL_dx, PXL_dy is not limited to the above described method. For example, the width Xa may be calculated by adding the distance between the coordinates Pd of the pressed point and the curve Lx3 to the distance $\Delta x$, and the height Ya may be calculated by adding the distance between the coordinates Pd of the pressed point and the curve Ly3 to the distance $\Delta y$.

The correction unit 42 adds offset numbers of pixels PXL_fx, PXL_fy in accordance with the location of the region Z on the input surface S to the calculated numbers of pixels PXL_dx, PXL_dy to calculate the corrected coordinates (Xc, Yc). The offset numbers of pixels PXL_fx, PXL_fy are distances in the X direction and in the Y direction from the corner of the input surface S corresponding to the original point of the X-Y plane to the region Z (to the coordinates P22' in this example), respectively.

$$PXL\_fx = PXL \cdot \{(r-1)/(q-1)\} \quad (13)$$

$$PXL\_fy = PXL \cdot \{(n-1)/(m-1)\} \quad (14)$$

The offset numbers of pixels PXL_fx, PXL_fy are calculated from the above expressions 13, 14 based on the integers r, n determined in accordance with the region Z, respectively. In the example of FIG. 8, as r is two (r=2) and n is two (n=2), thus PXL_fx=PXL/4 and PXL_fy=PXL/3.

$$(Xc, Yc) = (PXL\_fx + PXL\_dx, PXL\_fy + PXL\_dy) \quad (15)$$

The correction unit 42 calculates the offset numbers of pixels PXL_fx, PXL_fy and the numbers of pixels PXL_dx, PXL_dy, and then calculates the corrected coordinates (Xc, Yc) with the above expression 15. As described above, the correction unit 42 calculates the corrected coordinates (Xc, Yc) based on the location (r, n) of the specified region Z on the input surface S and the distances $\Delta x$, $\Delta y$ to the curves Lx1~Lx5, Ly1~Ly4. Thus, the correction unit 42 can calculate the corrected coordinates (Xc, Yc) without performing a complicated multiple-stage approximation process unlike Patent Document 2.

The expression 15 supposes that the electric potential distribution, is uniform in each region divided by the curves Lx1~Lx5, Ly1~Ly4. However, even when the electric potential distribution is not uniform, the corrected coordinates (Xc, Yc) can be calculated with high accuracy by applying the variables for corrections to the expression 15.

Back to FIG. 9, the correction unit 42 outputs the calculated corrected coordinates (Xc, Yc) to the application executed by, for example, the processor 4 or another processor (step St28). The correction process of the coordinates Pd is performed as described above.

As described above, the touch panel device of the embodiment approximates the curves Lx1~Lx5, Ly1~Ly4 by second-order polynomial equations, and thus can correct the coordinates with higher accuracy than the comparative example (the method disclosed in Patent Document 1).

Figure 10:
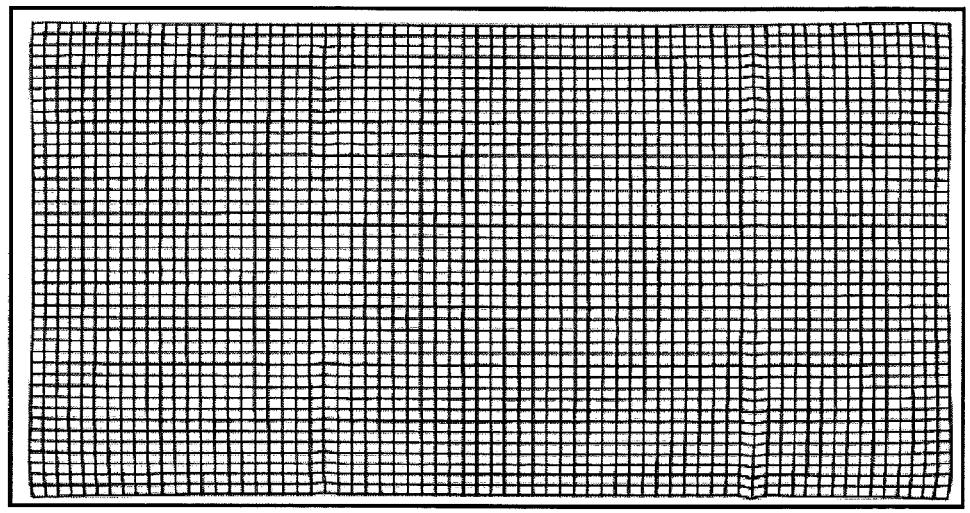
FIG. 10 is a diagram illustrating a grid coordinate pattern after the correction by an embodiment.

FIG. 10 is a grid coordinate pattern after the correction by the embodiment. FIG. 10 illustrates a grid coordinate pattern when nine-point calibration is performed in the five-wire touch panel 100B.

The comparison with the comparative example illustrated in FIG. 5 reveals that a curved part is not observed in the grid coordinate pattern in the present embodiment. That is to say, the method of correcting coordinates of the present embodiment can reduce a deviation of the corrected coordinates more than the comparative example.

Figure 11:
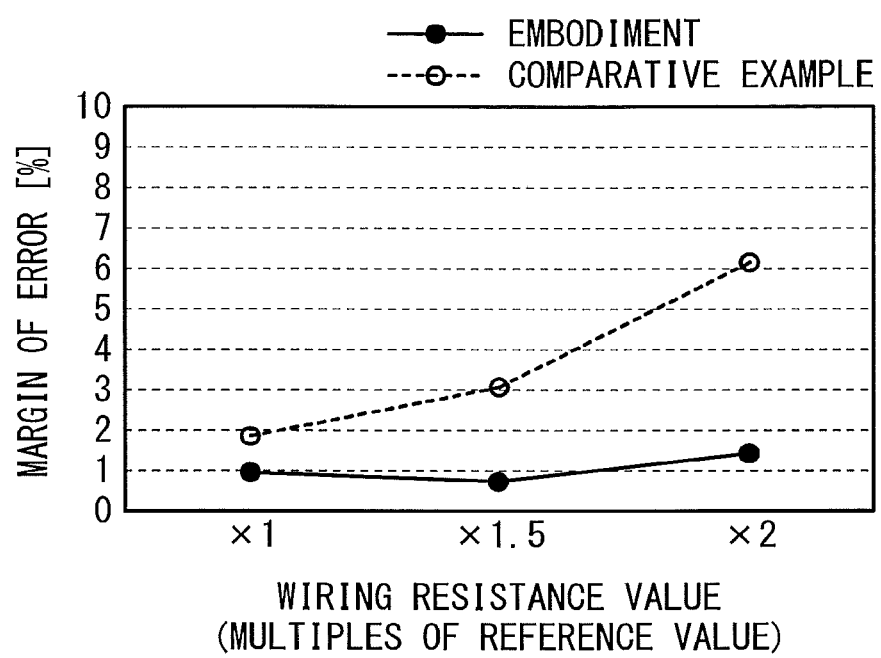
FIG. 11 is a graph of a wiring resistance value versus a margin of error of corrected coordinates in the embodiment and the comparative example.

FIG. 11 illustrates a graph of a wiring resistance value versus a margin of error of the corrected coordinates in the embodiment and the comparative example. In FIG. 11, the horizontal axis represents the wiring resistance values of the electrodes 22B~25B in a form of multiples of the reference value (×1, ×1.5, ×2), and the vertical axis represents a margin of error (%) of the corrected coordinates to the actual coordinates in the five-wire touch panel 100B.

The margin of error in the comparative example tends to increase as the wiring resistance value increases, as described above. In contrast, the increase in the margin of error in the embodiment is reduced even when the wiring resistance value increases. Thus, the embodiment can reduce the deviation of the corrected coordinates even when the wiring resistance value varies depending on the volume resistance value of ink and a variation in production conditions (especially, printing conditions).

Figure 12:
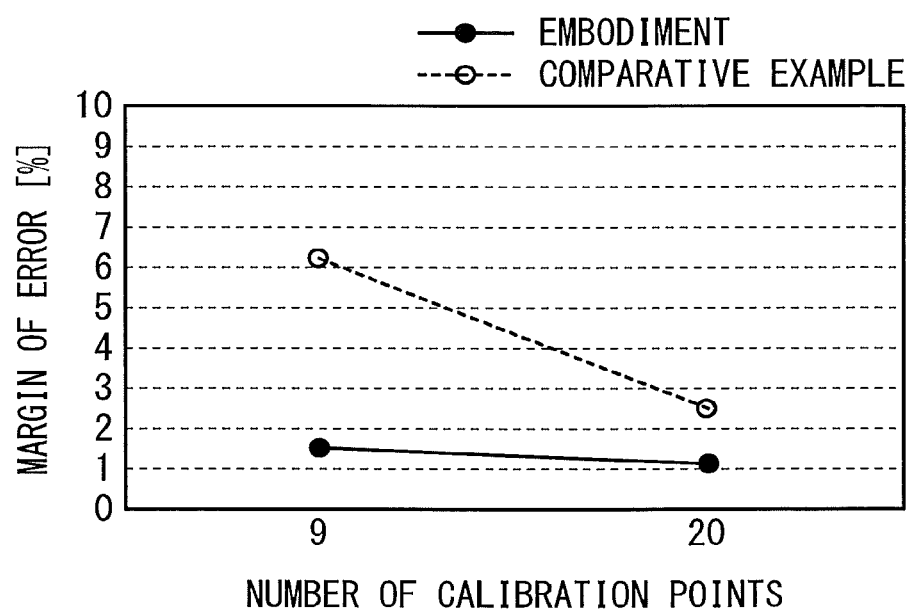
FIG. 12 is a graph of the number of calibration points versus a margin of error of corrected coordinates in the embodiment and the comparative example.

FIG. 12 is a graph of the number of calibration points versus a margin of error of the corrected coordinates in the embodiment and the comparative example. In FIG. 12, the horizontal axis represents the number of calibration points (nine, twenty), and the vertical axis represents a margin of error (%) of the corrected coordinates to the actual coordinates in the five-wire touch panel 100B.

The margin of error in the comparative example tends to increase as the number of calibration points decreases, as described above. In contrast, the margin of error in the embodiment remains low even when the number of calibration points decreases. That is to say, the embodiment reduces the influence of the number of calibration points on the correction accuracy.

Figure 13:
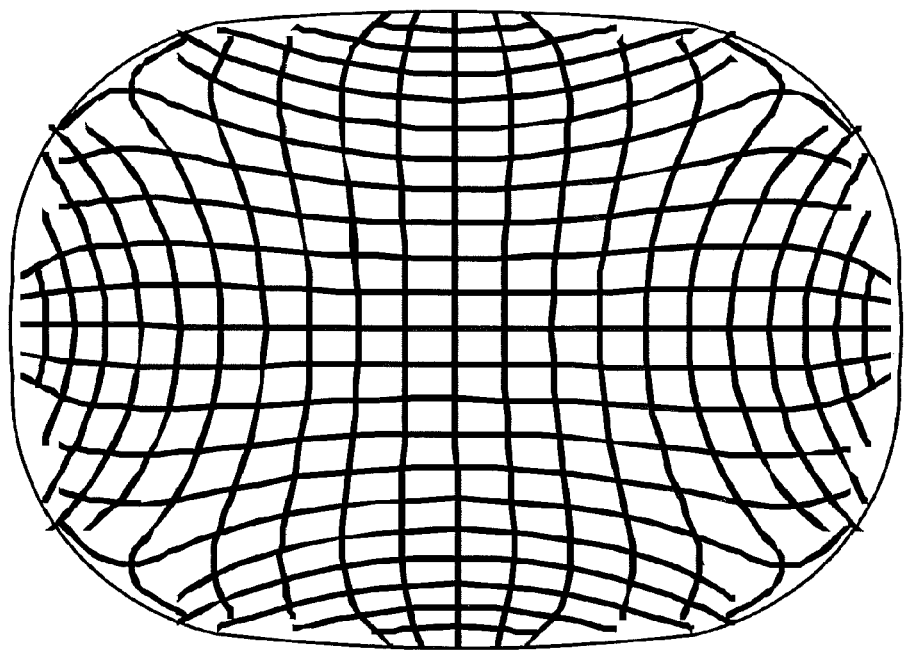
FIG. 13 is a diagram illustrating distortion characteristics of the grid coordinate pattern of the four-wire touch panel.

The embodiment of the five-wire touch panel 100B have been described, but the same effect can be obtained in the four-wire touch panel 100A by using the above correction method. FIG. 13 illustrates distortion characteristics of the grid coordinate pattern of the four-wire touch panel 100A. Here, the input surface S of the four-wire touch panel 100A has, for example, a circular shape.

The comparison with the distortion characteristics of the five-wire touch panel 100B illustrated in FIG. 4A and FIG. 4B reveals that the grid coordinate pattern of the four-wire touch panel 100A have a more complicated curving shape. Thus, the correction unit 42 can perform the correction with high accuracy by approximating the curves by four order or higher order polynomial equations as with in the case of the five-wire touch panel 100B. The method of correcting coordinates of the embodiment is not limited to be applied to the four-wire touch panel 100A or the five-wire touch panel 100B, may be applied to touch panels using other methods.

As described above, the touch panel device of the present invention includes the detection unit 41 that detects the coordinates of a pressed point on the input surface S of the touch panel 100A, 100B, and the correction unit 42 that corrects the coordinates detected by the detection unit 41 to obtain the corrected coordinates (Xc, Yc). The correction unit 42 approximates, when a predetermined number of the calibration points P11~P54 arranged on the input surface S are pressed, the curves Lx1~Lx5, Ly1~Ly4 passing through the coordinates P11~P54' detected by the detection unit 41 by second order or higher order polynomial equations.

Additionally, the correction unit 42 specifies, when an arbitrary point on the input surface S is pressed, the region Z including the coordinates Pd detected by the detection unit 41 from regions obtained by dividing the input surface S by the curves Lx1~Lx5, Ly1~Ly4. Furthermore, the correction unit 42 calculates the distances Δx, Δy from the coordinates Pd of the arbitrary point detected by the detection unit 41 to the curves Lx2, Ly2 that define the specified region Z among the curves Lx1~Lx5, Ly1~Ly4 with the second order or higher order polynomial equations. Then, the correction unit 42 calculates the corrected coordinates (Xc, Yc) based on the location (r, n) of the specified region Z on the input surface S and the distances Δx, Δy to the curves Lx2, Ly2.

The touch panel device of the present invention approximates the curves Lx1~Lx5, Ly1~Ly4 passing through the coordinates P11'~P54' of the calibration points P11~P54 by second order or higher order polynomial equations, and thus can calculate the corrected coordinates (Xc, Yc) with high accuracy.

Additionally, the correction unit 42 calculates the corrected coordinates (Xc, Yc) based on the location (r, n) of the specified region Z on the input surface S and the distances Δx, Δy to the curves Lx1~Lx5, Ly1~Ly4. Thus, the touch panel device of the present invention can calculate the corrected coordinates (Xc, Yc) without performing a complicated multiple-stage approximation process unlike Patent Document 2.

The method of correcting coordinates on a touch panel of the present invention detects the coordinates of a pressed point on the input surface S of the touch panel 100A, 100B, and corrects the detected coordinates to obtain the corrected coordinates (Xc, Yc). The method includes the following steps:

Step 1: approximating, when a predetermined number of the calibration points P11~P54 arranged on the input surface S are pressed, the curves Lx1~Lx5, Ly1~Ly4 passing through the detected coordinates P11'~P54' of the calibration points P11~P54 by second order or higher order polynomial equations;

Step 2: specifying, when an arbitrary point on the input surface S is pressed, the region Z including the detected coordinates Pd of the arbitrary point from regions obtained by dividing the input surface S by the curves Lx1~Lx5, Ly1~Ly4;

Step 3: calculating distances Δx, Δy from the detected coordinates Pd of the arbitrary point to the curves Lx2, Ly2 that define the specified region Z among the curves Lx1~Lx5, Ly1~Ly4 on with the second order or higher order polynomial equations; and Step 4: calculating the corrected coordinates (Xc, Yc) based on the location (r, n) of the specified region Z on the input surface S and the distances Δx, Δy to the curves Lx2, Ly2.

The method of correcting coordinates on a touch panel of the present invention has the same configuration as the above described touch panel device, and thus have the same effect as the above described effect.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch panel device comprising:
   at least one memory;
   at least one processor, coupled to the at least one memory, configured to cause the following to be performed:
   detecting coordinates of a pressed point on an input surface of a touch panel; and
   correcting the detected coordinates to obtain corrected coordinates by approximating, when a predetermined number of reference points arranged on the input surface are pressed, curves passing through the detected coordinates of the reference points by second order or higher order polynomial equations,
   specifying, when an arbitrary point on the input surface is pressed, a region including the detected coordinates of the arbitrary point from regions obtained by dividing the input surface by the curves,
   selecting two curves that are closest to the arbitrary point among curves that define the specified region among the curves with the second order or higher order polynomial equations,
   calculating distances from the coordinates of the arbitrary point to the selected curves, and
   calculating the corrected coordinates based on a location of the specified region on the input surface and the distances to the selected curves.

2. The touch panel device according to claim 1, wherein the correcting the detected coordinates to obtain the corrected coordinates further includes specifying the region including the coordinates of the arbitrary point based on coordinates calculated from the coordinates of the arbitrary point with the second order or higher order polynomial equations when the arbitrary point on the input surface is pressed.

3. A method of correcting coordinates on a touch panel, the method detecting coordinates of a pressed point on an input surface of the touch panel and correcting the detected coordinates to obtain corrected coordinates, the method comprising:
   approximating, when a predetermined number of reference points arranged on the input surface are pressed, curves passing through the detected coordinates of the reference points by second order or higher order polynomial equations;
   specifying, when an arbitrary point on the input surface is pressed, a region including the detected coordinates of the arbitrary point from regions obtained by dividing the input surface by the curves;
   selecting two curves that are closest to the arbitrary point among curves that define the specified region among the curves with the second order or higher order polynomial equations;
   calculating distances from the detected coordinates of the arbitrary point to the selected curves; and
   calculating the corrected coordinates based on a location of the specified region on the input surface and the distances to the selected curves.

* * * * *